(12) United States Patent
Zhang et al.

(10) Patent No.: US 8,548,882 B2
(45) Date of Patent: Oct. 1, 2013

(54) DETERMINATION OF A BID VALUE ASSOCIATED WITH A SELECTED BIDDER

(75) Inventors: Bin Zhang, Fremont, CA (US); Kemal Guler, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 3307 days.

(21) Appl. No.: 10/672,953

(22) Filed: Sep. 26, 2003

(65) Prior Publication Data

US 2005/0080708 A1 Apr. 14, 2005

(51) Int. Cl.
*G06Q 40/00* (2012.01)

(52) U.S. Cl.
USPC .................................. 705/35; 75/37; 75/36 R

(58) Field of Classification Search
USPC ...................................................... 705/37, 35
See application file for complete search history.

(56) References Cited

U.S. PATENT DOCUMENTS

| | | | | |
|---|---|---|---|---|
| 6,061,662 | A * | 5/2000 | Makivic | 705/36 R |
| 7,096,197 | B2 * | 8/2006 | Messmer et al. | 705/37 |
| 2002/0046157 | A1 | 4/2002 | Solomon | |
| 2002/0069134 | A1 | 6/2002 | Solomon | |
| 2002/0082969 | A1 | 6/2002 | O'Keeffe et al. | |
| 2002/0116315 | A1 | 8/2002 | Grey et al. | |
| 2002/0120552 | A1 | 8/2002 | Grey et al. | |
| 2002/0147045 | A1 | 10/2002 | La Mura et al. | |
| 2002/0174052 | A1 * | 11/2002 | Guler et al. | 705/37 |
| 2003/0014349 | A1 | 1/2003 | Guler et al. | |
| 2003/0018515 | A1 | 1/2003 | Guler et al. | |
| 2003/0018562 | A1 | 1/2003 | Guler et al. | |
| 2003/0041001 | A1 | 2/2003 | Hoffman et al. | |
| 2003/0041007 | A1 | 2/2003 | Grey et al. | |
| 2003/0041008 | A1 | 2/2003 | Grey et al. | |
| 2003/0041009 | A1 | 2/2003 | Grey et al. | |
| 2003/0041011 | A1 | 2/2003 | Grey et al. | |
| 2003/0041013 | A1 | 2/2003 | Grey et al. | |
| 2003/0041014 | A1 | 2/2003 | Grey et al. | |
| 2003/0055773 | A1 | 3/2003 | Guler et al. | |
| 2003/0069825 | A1 | 4/2003 | Hoffman et al. | |
| 2003/0093357 | A1 | 5/2003 | Guler et al. | |

OTHER PUBLICATIONS

Jean-Jacques Laffont, Game theory and empirical economics: The case of auction data,European Economic Review 41_1997. 1-35.*
Haili Song, Chen-Ching Liu, Jacques LawarreeDecision Making of an Electricity Supplier's Bid in a Spot Market,Power Engineering Society Summer Meeting, 1999. IEEE (vol. 2 ).*
Yongjun Ren, and Francisco D. GalianaPay-as-Bid versus Marginal Pricing—Part I: Strategic Generator Offers,IEEE Transactions on Power Systems, vol. 19, No. 4, Nov. 2004.*
Kemal Guler, "Equilibrium in Copula Models of First Price Auction," Dec. 20, 2002, 20 pp.
Paul R. Milgrow et al., "A Theory of Auctions and Competitive Bidding," Econometrica, vol. 50, No. 5, Sep. 1982, pp. 1089-1123.
Emmanuel Guerre et al., "Optimal Nonparametric Estimation of First-Price Auctions," Econometrica, vol. 68, No. 3, May 2000, pp. 525-574.

* cited by examiner

*Primary Examiner* — Alexander Kalinowski
*Assistant Examiner* — Chuks Onyezia

(57) ABSTRACT

A method and associated system comprise obtaining historical auction data, determining, from the historical auction data, a first parameter that is a function of a joint bid distribution and a density function related to the joint bid distribution, selecting a bidder, obtaining a value distribution for the selected bidder, and solving an equation. The equation may include the first parameter and the selected bidder's value distribution, and not the value distribution of other bidders. The equation computes a bid value associated with the selected bidder for a given bid.

19 Claims, 2 Drawing Sheets

DETERMINATION OF A BID VALUE ASSOCIATED WITH A SELECTED BIDDER

BACKGROUND

Increasingly, auctions are becoming an integral part of a company's strategy for procurement and excess disposal. Auctions can produce substantial cost savings by lowering transaction and negotiation costs, and reducing uncertainty. To remain competitive in this arena it is desirable to make optimal auction decisions. These decisions range from a seller setting the optimal reserve price to a bidder estimating the characteristics of his competitors. Underlying auction decisions is the joint distribution of bidder values. With this characterization of the auction market, structural variables can be estimated and bidder behavior can be forecast. Improved techniques for estimating bidders' bid values are desirable.

BRIEF SUMMARY

In at least some embodiments, a method comprises obtaining historical auction data, determining, from the historical auction data, a first parameter that is a function of a joint bid distribution and a density function related to the joint bid distribution, selecting a bidder, obtaining a value distribution for the selected bidder, and solving an equation. The equation may include the first parameter and the selected bidder's value distribution, and not the value distribution of other bidders. The equation computes a bid value associated with the selected bidder for a given bid.

In another embodiment, a system comprises a processor and memory containing software executable by the processor. When executing the software, the processor computes a ratio of an estimate of a density function to an estimate of a joint bid distribution, permits a bidder to be selected, obtains a probability value distribution for the selected bidder, and solves an ordinary differential equation. The ordinary differential equation may include the selected bidder's probability value distribution, and not the probability value distribution of other bidders, to compute a bid value associated with the selected bidder.

BRIEF DESCRIPTION OF THE DRAWINGS

For a detailed description of the embodiments of the invention, reference will now be made to the accompanying drawings in which.

NOTATION AND NOMENCLATURE

Figure 1:
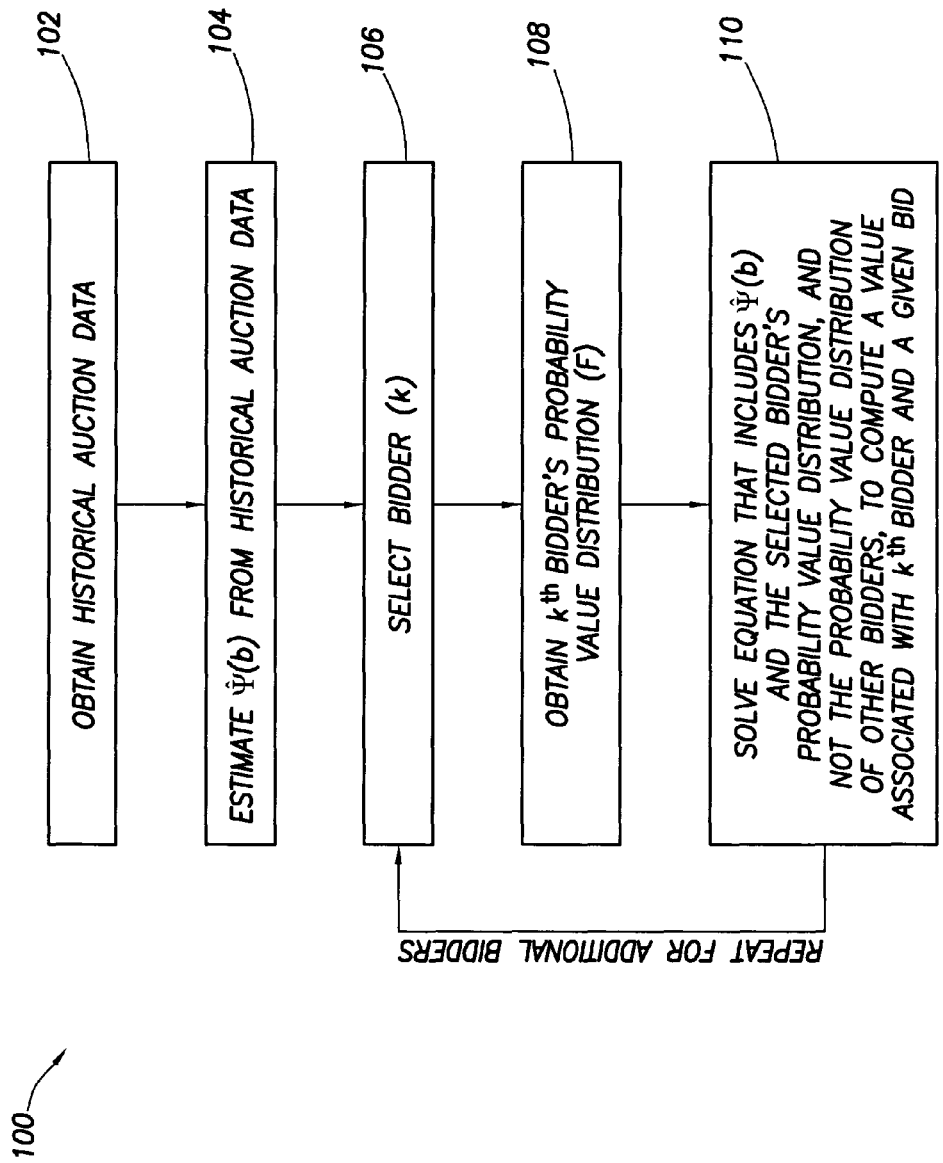
FIG. 1 depicts an exemplary process of computing a value associated with a selected bidder and a given bid.

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter described herein generally is directed to auctions comprising n bidders, where n is greater than one. The auctions may be implemented as first price, sealed bid auctions in which each bidder is permitted only one bid and the each bidder has no knowledge of the bid prices entered by other bidders. In accordance with the embodiments of the invention, an analytical process is provided herein in which an equation is solved for a given bidder to compute that bidders' "bid valuation" of the item being auctioned. As used herein, the term "bid valuation" refers to the amount (e.g., money) that the bidder theoretically had in mind when entering a particular bid. Alternatively stated, if a bidder believes a widget being auctioned has a particular value, a bid can be determined that is optimal for that particular value. A relationship exists, therefore, between the $i^{th}$ bidder's value $v_i$ and that bidder's bid $b_i$. Moreover, a value distribution can be delineated for a given bidder. In this disclosure, the function $\phi(b)$ is the $i^{th}$ bidder's value as a function of the bid amount, $b_i$. For a given value, the inverse of function $\phi(b)$ computes the $i^{th}$ bidder's optimal bid. Conversely, for a given bid, the function $\phi(b)$ computes the value that the bidder theoretically had in mind when entering that particular bid.

"Symmetric" auctions are auction in which all bidders are assumed to have the same value distribution. In "asymmetric" auctions, each bidder may have a different value distribution than other bidders participating in the auction. Mathematically, the asymmetric auction case can be represented as:

$$\phi_i \neq \phi_2 \neq \ldots \neq \phi_k \tag{1}$$

where the index i identifies one of k bidders.

For the asymmetric case, the following equation may be used to solve for a bidder's bid value:

$$\frac{d\log F_k(\varphi_k(b))}{db} + \frac{1}{\varphi_k(b) - b} = \Psi(b) \tag{2}$$

Equation (2) is an ordinary differential equation ("ODE") meaning that the equation involves a function of only one variable and the derivative of the function. In the embodiments described herein, the variable comprises the value distribution for a given bidder. Equation solvers and equation solving techniques are readily available and/or known for solving the ODE of equation (2). The terms of equation (2) comprise:

b Bid amount k Bidder index (k ranges from 1 to the number of bidders participating in the auction)

$\phi_k(b)$ The value distribution function for bidder k $F(\phi_k(b))$ The probability distribution function for bidder k's value distribution Ψ(b) A parameter that can be defined in some embodiments as the ratio of a joint bid distribution to a density function related to the joint bid distribution. Ψ(b) can be chosen based on prior knowledge or estimated from historical data.

The function Ψ(b) is given by:

$$\Psi(b) = \frac{1}{n-1} \sum_{i=1}^{n} \frac{1}{\varphi_i(b) - b} \quad (3)$$

Summing up equation (2) for all k provides:

$$\sum_{i=1}^{n} \frac{d \log F_k(\varphi_k(b))}{db} + (n-1)\Psi(b) = n\Psi(b) \quad (4)$$

Solving for Ψ(b) results in:

$$\Psi(b) = \sum_{k=1}^{n} \frac{d \log F_k(\varphi_k(b))}{db} \quad (5)$$
$$= \frac{d}{db} \log F(\varphi_1(b), \ldots, \varphi_n(b))$$
$$= \frac{d}{db} \log G(b, \ldots, b)$$

With the result in equation (5), the estimation $\hat{G}(b)$ of G(b, . . . , b) is readily available from historical bids by counting assuming that a non-trivial number of data points are available in the data set. Thus, $$G(b) = \frac{1}{N*n} |\{b_{i,j} \mid b_{i,j} < b\}| \quad (6)$$

where $B=\{b_{i,j}|i=1, \ldots, n; j=1, \ldots, N\}$ and is the set of bidding data from N auctions with n bidders. In this way, Ψ(b) can be computed as the derivative of the logarithm of a smoothed version of $\hat{G}(b)$. Smoothing can be performed by polynomial curve fitting using, for example, splines, or other suitable techniques.

An alternative method for estimating Ψ(b) comprises using the standard kernel estimation of the derivative of G(b, . . . , b), that is $\hat{g}(b)$, and then estimating Ψ(b) by:

$$\hat{\Psi}(b) = \frac{\hat{g}(b)}{\hat{G}(b)} \quad (7)$$

To estimate $\hat{g}(b)$, the n-dimensional data is turned into one-dimensional data by picking the maximum bid in each auction record before applying the kernel method. As such, the dimensionality of the kernel is 1. This results in an estimate of $\hat{g}(b)$ as follows:

$$\hat{g}(b) = \frac{1}{N*h_g} \sum_{l=1}^{N} K_g\left(\frac{b - b_{l,\max}}{h_g}\right) \quad (8)$$

where $K_g$ is a one-dimensional kernel function and $h_g$ is the bandwidth.

FIG. 1 shows an exemplary method 100 in which a selected bidder's value is determined. Method 100 includes determining or otherwise obtaining historical auction data in block 102. The historical auction data obtained may comprise the date of the auction, a description of the auctioned item, the bids from all bidders, the winner and the amount paid. At 104, an estimate $\hat{\Psi}(b)$ is obtained from the historical data through the application of equation (7) above. At block 106, a bidder selected, indexed by k, is selected from one or more bidders. For the selected bidder, that bidder's probability value distribution F is obtained (block 108). The bidder's probability value distribution F can be obtained in accordance with one or more suitable techniques such as estimation from historical auction data.

In block 102, an equation is solved that includes $\hat{\Psi}(b)$ and the selected bidder's probability value distribution, and not the probability value distribution of other bidders, to compute a bid value associated with the selected bidder for a given bid. In this way, each bidder can be analyzed without having to use the probability value distributions of the other bidders. In accordance with the embodiments of the invention, the equation solved in block 102 comprises equation (2) above.

Figure 2:
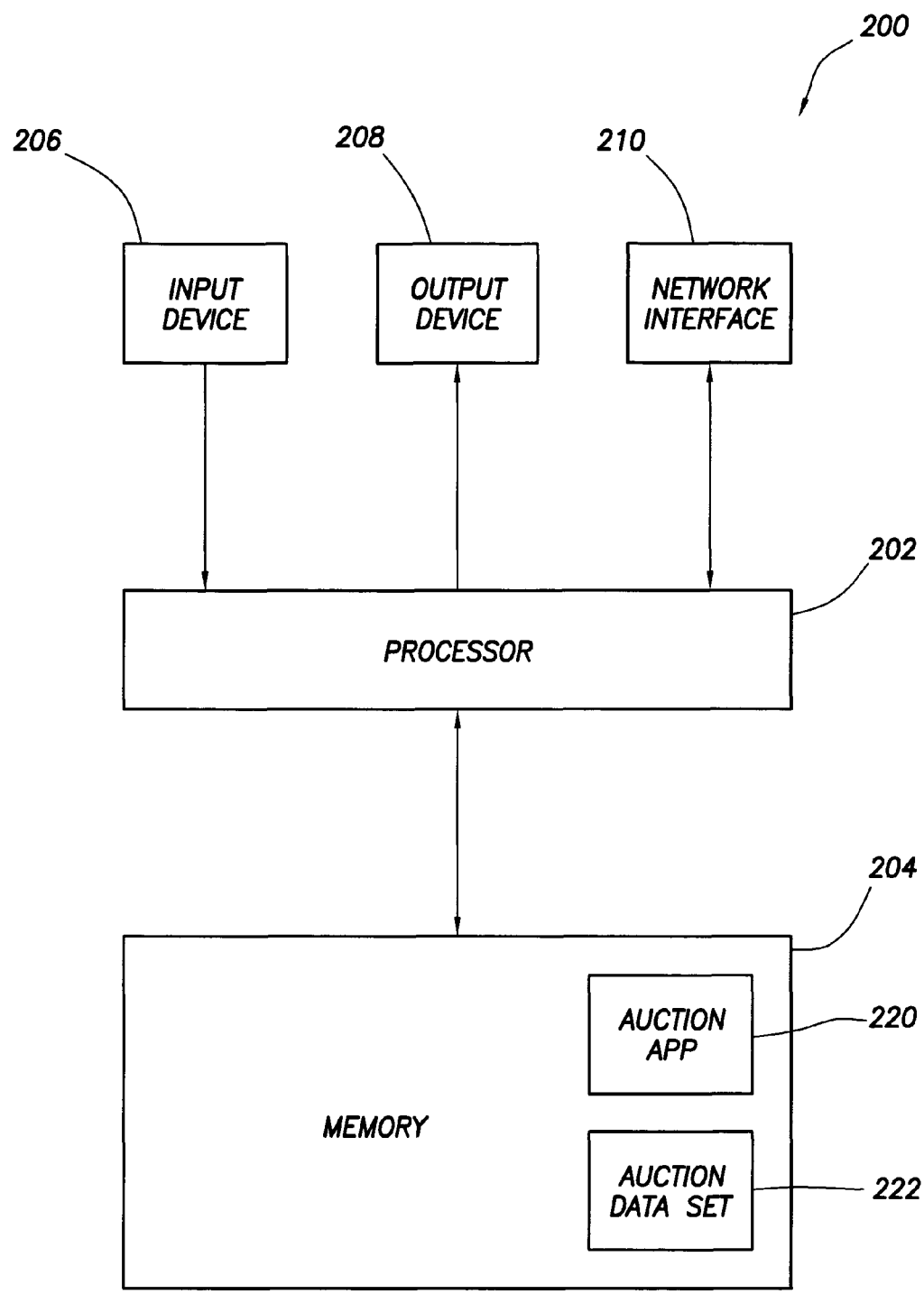
FIG. 2 shows a system configured to implement the process of FIG. 1.

FIG. 2 illustrates an exemplary embodiment of a system 200 that implements the techniques described herein. As shown, the system 200 may include a processor 202 coupled to a memory 204, an input device 206, an output device 208 and a network interface 210. The memory 204 may comprise volatile memory and/or non-volatile memory and contain an auction application 220 that is executed by processor 202. Auction application 220 performs some or all of the actions described above. For example, the auction application 220 may include, or otherwise call, a differential equation solver to solve the ODE (2) provided above. The input device 206 may comprise a keyboard, mouse, or other suitable type of input device. The output device 208 may comprise a display. The network interface 210 provides the system 200 with connectivity to a network. The historical auction data sets processed by the auction application 220 may be stored in memory 204 as auction data set 222 or on the network and provided to the system 200 via the network interface 210.

The above discussion is meant to be illustrative of the principles and various embodiments of the present invention. Numerous variations and modifications will become apparent to those skilled in the art once the above disclosure is fully appreciated. The following claims embrace all such variations and modifications.

What is claimed is:

1. A method, comprising:
   obtaining historical auction data;
   determining, with a computer from the historical auction data, a first parameter that is a function of both a joint bid distribution and a density function related to the joint bid distribution;
   selecting, with the computer, a bidder;
   obtaining, with the computer, a value distribution for the selected bidder; and
   solving, with the computer, an equation that includes the first parameter and the selected bidder's value distribution, and not the value distribution of other bidders, to compute a bid value associated with the selected bidder for a given bid.

2. The method of claim 1 wherein solving the equation comprises solving an ordinary differential equation that comprises a probability value distribution associated with the selected bidder and the derivative of the probability value distribution.

3. The method of claim 1 wherein solving the equation comprises solving d log $F_k(\psi_k(b))/db+1/(\psi_k(b)-b)=\Psi(b)$ where $\Psi(b)$ comprises the first parameter, b is a bid, $\psi_k(b)$ is the selected bidder's value distribution, k is an index identifying the selected bidder, and $F_k(\psi_k(b))$ is the probability value distribution for the selected bidder, and wherein $\Psi(b)$ is a ratio of the joint bid distribution and to the density function and is solved to compute the bid value associated with the selected bidder for the given bid.

4. The method of claim 1 wherein determining a first parameter comprises computing a ratio of the density function to the joint bid distribution.

5. The method of claim 1 further comprising repeating the acts of selecting a bidder, obtaining a probability value distribution for the selected bidder and solving the equation for additional bidders.

6. A system, comprising:
a processor; and
memory containing software executable by said processor;
wherein, by executing said software, said processor computes a ratio of an estimate of a density function to an estimate of a joint bid distribution, permits a bidder to be selected, obtains a probability value distribution for the selected bidder, and solves an ordinary differential equation that includes the selected bidder's probability value distribution, and not the probability value distribution of other bidders, to compute a bid value associated with the selected bidder.

7. The system of claim 6 wherein the ordinary differential equation comprises the ratio.

8. The system of claim 6 wherein the processor solves the ordinary differential equation multiple times, each time for a different selected bidder and each time without using probability value distributions associated with other bidders.

9. The system of claim 6 wherein the equation comprises: d log $F_k(\psi_k(b))/db+1/(\psi_k(b)-b)=\Psi(b)$ where $\Psi(b)$ comprises the ratio, b is a bid, $\psi_k(b)$ is the selected bidder's value distribution, k is an index identifying the selected bidder, and $F_k(\psi_k(b))$ is the probability value distribution for the selected bidder, and wherein $\Psi(b)$ is the ratio of the joint bid distribution and to the density function and is solved to compute the bid value associated with the selected bidder for a given bid.

10. The system of claim 6 wherein computing the ratio comprises obtaining historical bid data.

11. The system of claim 6 wherein the processor determines a reserve price based on the computed bid value.

12. A system, comprising:
means for determining a ratio of an estimate of a density function to an estimate of a joint bid distribution;
means for selecting a bidder;
means for obtaining a probability value distribution for the selected bidder; and
means for evaluating an ordinary differential equation that includes the selected bidder's probability value distribution, and not the probability value distribution of other bidders, to compute a bid value associated with the selected bidder.

13. The system of claim 12 further including means for obtaining historical bid data to be used by the means for determining the ratio.

14. A computer readable storage medium storing instructions that when executed by a processor cause the processor to determine a bid value for a bidder of a action, said instructions comprising:
an instruction usable to obtain previously acquired auction information;
an instruction usable to determine, from the previously acquired auction information, a first parameter that is a function of both a joint bid distribution and a density function related to the joint bid distribution;
an instruction usable to determine a bidder;
an instruction usable to obtain a value distribution for the determined bidder; and
an instruction usable to solve an equation that includes the first parameter and the determined bidder's value distribution, and not the value distribution of other bidders, to compute a bid value associated with the determined bidder for a given bid.

15. The storage medium of claim 14 wherein the instruction usable to solve the equation comprises an instruction usable to solve an ordinary differential equation.

16. The storage medium of claim 15 wherein the instruction usable to solve the equation comprises an instruction usable to solve d log $F_k(\psi_k(b))/db+1/(\psi_k(b)-b)=\Psi(b)$ where $\Psi(b)$ comprises the first parameter, b is a bid, $\psi_k(b)$ is the selected bidder's value distribution, k is an index identifying the selected bidder, and $F_k(\psi_k(b))$ is the probability value distribution for the selected bidder, and wherein $\Psi(b)$ is a ratio of the joint bid distribution and to the density function and is solved to compute the bid value associated with the selected bidder for the given bid.

17. The storage medium of claim 15 wherein the instruction usable to determine the first parameter comprises an instruction usable to compute a ratio of an estimate of the density function to an estimate of the joint bid distribution.

18. The method of claim 1 further comprising displaying the bid value associated with the selected bidder for the given bid.

19. The system of claim 12 wherein the means for evaluating an ordinary differential equation solves d log $F_k(\psi_k(b))/db+1/(\psi_k(b)-b)=\Psi(b)$ where $\Psi(b)$ comprises the first parameter, b is a bid, $\psi_k(b)$ is the selected bidder's value distribution, k is an index identifying the selected bidder, and $F_k(\psi_k(b))$ is the probability value distribution for the selected bidder, and wherein $\Psi(b)$ is a ratio of the joint bid distribution and to the density function and is solved to compute the bid value associated with the selected bidder for the given bid.

* * * * *